UNITED STATES PATENT OFFICE.

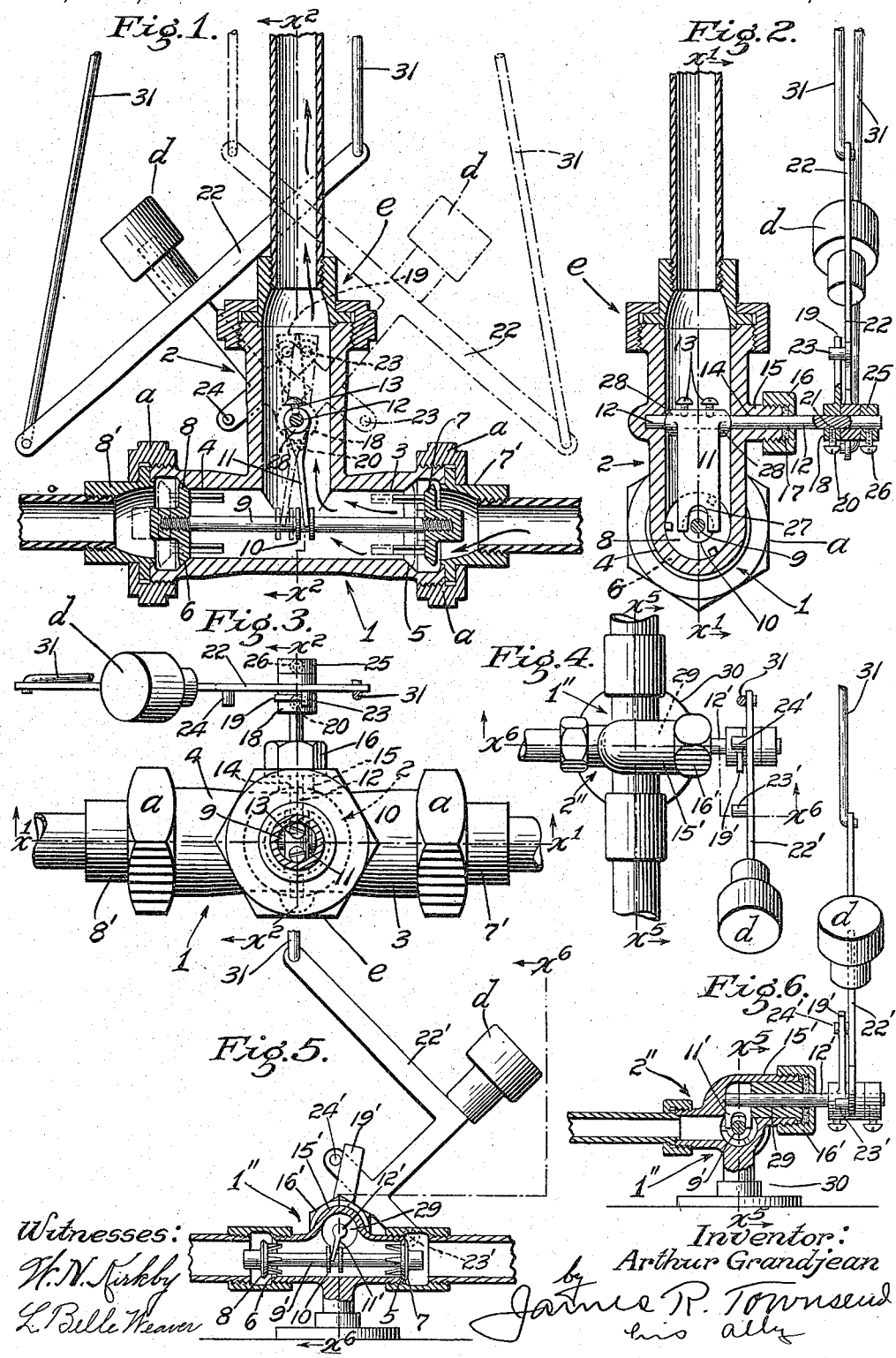

ARTHUR GRANDJEAN, OF SAN DIEGO, CALIFORNIA.

AUTOMATIC CUT-OFF THREE-WAY VALVE.

1,177,100. Specification of Letters Patent. Patented Mar. 28, 1916.

Application filed September 17, 1913. Serial No. 790,374.

*To all whom it may concern:*

Be it known that I, ARTHUR GRANDJEAN, a citizen of the United States, residing at San Diego, in the county of San Diego and State of California, have invented a new and useful Automatic Cut-Off Three-Way Valve, of which the following is a specification.

This invention relates to valves adapted for supplying air from air pumps to carbureters and also adapted for supplying motive fluid, as compressed air or water under pressure, to a motor designed to operate the bells of air pumps.

The invention may be put to various uses and I do not limit it to any particular use.

An object of the invention is to provide a quick and light action three-way valve, simple in construction, easily installed and taken apart; of few parts, the joints of which can be easily packed against the escape of air or water, and which will cut off the flow through one orifice and open another orifice practically instantaneously when operated, and which can be operated with very light power and is not liable to stick.

The accompanying drawings illustrate the invention.

Figure 1 is a sectional elevation on line $x^1$, Figs. 2 and 3, showing the invention as applied in a three-way valve of one form. Solid lines and dot and dash lines indicate alternate positions of parts. Fig. 2 is a section of the same on line $x^2$, Figs. 1 and 3. Fig. 3 is a plan view of the form shown in Figs. 1 and 2. Fig. 4 is a plan view of another form of construction. Fig. 5 is a sectional elevation on line $x^5$, Figs. 4 and 6, of said other form. Fig. 6 is a sectional elevation of said other form viewed from irregular line $x^6$, Figs. 4 and 5.

Arrows indicate the direction of sight on the various views.

First referring to the form shown in Figs. 1, 2 and 3, the straightway valve body or barrel 1 is provided with a side limb 2 between its ends 3 and 4 which are open and provided with valve seats 5, 6. Valves 7, 8 for said valve seats are screw threaded to be adjustably connected by a screw threaded valve stem 9 spacing said valves a different distance apart than the valve seats, so that when one of the valves is seated the other is open, and vice versa. It is desirable, but not necessary, that the valve seats be between the valves as shown and that the valves be adjusted to such distance from one another to close the seats 5, 6, but it is understood that the valves may be adjusted at greater distances from one another by relatively turning the valves and valve stem so as to seat alternately on the inner ends of union members 7' and 8' which are held on said barrel by the usual union nuts $a$ to form an inlet and outlet respectively. Said valve stem 9 has between its ends a pair of shoulders 10, which as shown, are in the form of flanges between which a finger 11 extends from an operating shaft 12 that is fastened thereto by screws 13 and is mounted in an orifice 14 above the level of the valve stem 9. Said orifice extends through a boss 15 on which is screwed a gland 16 to compress packing 17 around the shaft to prevent leakage. Said shaft may be provided with a collar 18 having an arm 19 thereon and fixed to the shaft outside said body 1 by a set-screw 20, the tip of which enters a seat 21 therefor in the shaft.

A weighted trip arm 22 having an overbalancing weight $d$ is provided for alternately opening and closing valves 7 and 8. To accomplish this, the trip arm is provided with lugs 23, 24 provided on opposite sides of and arranged to alternately engage the arm 19 to move it in first one and then the other direction as the trip arm is moved from side to side of the shaft 12 on which it is journaled. To fix said trip arm against sliding along said shaft 12, a collar 25 and set-screw 26 is provided. By this construction it is seen that the leverage exerted by the weight $d$ as the trip arm 22 oscillates from side to side of the vertical mid plane of the device is maximized so as to forcibly shut and maintain closure of the valve 7 or 8 as the case may be.

One or both of the valves 7 and 8 may be detachably secured to the valve stem and, in the form shown, both are screwed thereon; and when one of said valves is entirely removed from or sufficiently loosened from the stem at one end, and the gland is unscrewed from the other end of the barrel the valve stem can be withdrawn from the valve barrel 1, the end of the stem dropping down to withdraw the shoulders 10 from the finger 11. By removing the union $e$ access to the limb 2 may be had for the purpose of screwing or unscrewing the screws 13 to loosen the shaft 14, which may then be withdrawn from the boss and from the finger, it usually being necessary to first unscrew the gland 16. The finger 11 is preferably bifurcated at its lower end, the slot 27 accommodating the valve stem 9 as the finger swings. Said finger is provided at its upper end with a bearing 28 into which the shaft 12 is fitted, and said bearing extends laterally from the finger, as clearly shown in Fig. 2, to fit inside the hollow limb 2 in order to center said finger in actual alinement with said limb.

In the form shown in Figs. 4, 5 and 6 the limb 2″ extends over at 15′ to practically produce a substitute for the boss 15 and after the bifurcated finger 11′, which is integral with operating shaft 12′ in this form, is passed through the open end of said boss and mounted in place upon the valve stem 9′, a headed bushing 29 is slipped onto the shaft 12′ and inserted into the open end to form a bearing for the shaft 12′, after which a gland 16′ is screwed upon the outer end of the boss to compress the packing against the head of the bushing to prevent leakage. The valve body may be provided below the limbs 1″ and 2″ with a supported base 30 and the operating shaft 12′, mounted outside of the limb 2″, in this form, is provided with a similar arm 19′, weighted lever 22′ and lugs 23′, 24′, after the manner above described.

The links, bars or rods 31 connected to the trip arms 22 are operated by external power, as the bell of an air pump, not shown; and serve to shift the valve stem and valves from side to center in each direction.

In practical operation the links will be operated by suitable mechanism not shown, such, for instance, as is shown and described at length in Letters Patent of the United States, No. 953606, granted to me March 29, 1910, thus oscillating the trip arm 22 from side to side of the vertical mid plane of the device to open the valve 7 or 8 as the case may be, whereupon the weight d will overbalance the trip arm and cause the lug 23 or 24 as the case may be to deliver a hammer-like blow on the arm 19 so as to quickly and forcibly close the valve 7 or valve 8 as the case may be and securely hold said valve against the pressure of the fluid tending to force it open.

From the foregoing it is clear that in the form shown in Fig. 1, the shaft 12, arm 19, trip arm 22 and lugs 23 24, and in the form shown in Fig. 5, the shaft 12′, arm 19′, trip arm 22′ and lugs 23′ 24′, as the case may be, constitute lost-motion mechanism between the stem 9 or 9′ and the operating rods 31 whereby a hammer-like blow will be transmitted to said stem when the rod is operated.

I claim:—

1. An automatic cut-off three-way valve comprising a valve body having a boss and being provided with two outlets and an inlet, one of said outlets and the inlet being co-axial with each other and provided with valve seats; valves for said valve seats; a valve stem connecting said valves and having between its ends a pair of shoulders; a finger between said shoulder; a shaft from which the finger extends; there being an orifice in said boss through which said shaft extends; packing on the boss and surrounding the shaft, a gland surrounding the shaft and screwed on the boss to compress the packing; an arm fixed to the shaft outside said gland and body; a weighted trip arm provided with lugs spaced apart on opposite sides of the arm to alternately contact therewith, and links at opposite ends of the weighted arm to shift the weighted arm to overbalancing positions above the shaft from side to side thereof.

2. The combination with a three-way valve body having two valve seats; valves to close said seats and a stem provided with shoulders and connecting said valves; an operating shaft journaled in said body and provided with a finger operating between said shoulders; of a collar having an arm thereon and fixed to the shaft outside said body by a set-screw; a weighted trip arm journaled on the shaft and having an overbalancing weight for alternately opening and closing the valves, said trip arm being provided with lugs on opposite sides of and arranged to alternately engage the arm to move it in first one and then the other direction as the trip arm is moved from side to side of the shaft on which it is journaled on the collar; and means to prevent the trip arm from sliding along the shaft.

In testimony whereof, I have hereunto set my hand at San Diego, California, this 10th day of September, 1913.

ARTHUR GRANDJEAN.

In presence of—
EARL E. EMERY,
H. E. CRANE.

Copies of this patent may be obtained for five cents each, by addressing the "Commissioner of Patents, Washington, D. C."